(12) United States Patent
Konishi

(10) Patent No.: US 11,172,115 B2
(45) Date of Patent: Nov. 9, 2021

(54) IMAGE PROCESSING APPARATUS

(71) Applicant: SHARP KABUSHIKI KAISHA, Osaka (JP)

(72) Inventor: Yohsuke Konishi, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 112 days.

(21) Appl. No.: 16/542,873

(22) Filed: Aug. 16, 2019

(65) Prior Publication Data

US 2020/0068118 A1    Feb. 27, 2020

(30) Foreign Application Priority Data

Aug. 27, 2018    (JP) .............................. JP2018-158483

(51) Int. Cl.
*H04N 5/232*    (2006.01)
*H04N 5/77*    (2006.01)

(52) U.S. Cl.
CPC ..... *H04N 5/23206* (2013.01); *H04N 5/23245* (2013.01); *H04N 5/77* (2013.01)

(58) Field of Classification Search
CPC ................................................. H04N 5/23206
USPC .................................................... 348/207.11
See application file for complete search history.

(56) References Cited

U.S. PATENT DOCUMENTS

| 9,019,385 | B2 | 4/2015 | Yoneda | |
| 2010/0289914 | A1* | 11/2010 | Shinomiya | ....... H04N 21/21805 348/222.1 |
| 2013/0038902 | A1 | 2/2013 | Sato | |
| 2013/0265449 | A1* | 10/2013 | Yoneda | .............. H04N 5/23206 348/207.1 |

FOREIGN PATENT DOCUMENTS

| CN | 102932574 A | 2/2013 |
| JP | 2013-219617 A | 10/2013 |

* cited by examiner

*Primary Examiner* — Joel W Fosselman
(74) *Attorney, Agent, or Firm* — ScienBiziP, P.C.

(57) ABSTRACT

An image processing apparatus includes a moving image data acquisition unit that acquires moving image data from one or more cameras connected via a network, a storage unit that stores the moving image data that is acquired and camera image related information used to generate a camera setting content of a setting item related to image capturing of a camera, a camera setting change unit that generates or changes the camera setting content associated with the camera image related information that is stored, and a camera setting transmission unit that transmits, to the camera, the camera setting content that is generated, in which the camera image related information includes at least a saving period in which the moving image data is saved in the storage unit.

9 Claims, 13 Drawing Sheets

FIG. 2

| STREAM SETTING | VIDEO RESOLUTION | |
| --- | --- | --- |
| | BIT RATE (BR) | |
| | FRAME RATE (FL) | |
| CAMERA ADJUSTMENT | EXPOSURE | |
| | WHITE BALANCE | |
| | IMAGE ADJUSTMENT | LUMINANCE |
| | | SHARPNESS |
| | | CONTRAST |
| | | SATURATION |
| | | COLORATION |
| | NOISE REDUCTION | |

| NORMAL MODE: M1 | MAXIMUM SAVING CAPACITY MS = 128 GB | | | |
|---|---|---|---|---|
| SAVING PERIOD: T | 7 DAYS | | | |
| NUMBER OF CAMERAS: N | 1 | 2 | 3 | 4 |
| FRAME RATE: FL | 10 FPS | 5 FPS | 3 FPS | 3 FPS |
| BIT RATE: BR | 5 Mbps | 5 Mbps | 5 Mbps | 4 Mbps |
| SAVING PERIOD: T | 14 DAYS | | | |
| NUMBER OF CAMERAS: N | 1 | 2 | 3 | 4 |
| FRAME RATE: FL | 10 FPS | 5 FPS | 3 FPS | 3 FPS |
| BIT RATE: BR | 2.5 Mbps | 2.5 Mbps | 2.5 Mbps | 2 Mbps |
| SAVING PERIOD: T | 30 DAYS | | | |
| NUMBER OF CAMERAS: N | 1 | 2 | 3 | 4 |
| FRAME RATE: FL | 5 FPS | 3 FPS | 3 FPS | 3 FPS |
| BIT RATE: BR | 2.3 Mbps | 2 Mbps | 1.3 Mbps | 1 Mbps |

FIG. 3A

| MOTION PRIORITY MODE: M2 | MAXIMUM SAVING CAPACITY MS = 128 GB | | | |
|---|---|---|---|---|
| SAVING PERIOD: T | 7 DAYS | | | |
| NUMBER OF CAMERAS: N | 1 | 2 | 3 | 4 |
| FRAME RATE: FL | 12 FPS | 6 FPS | 4 FPS | 4 FPS |
| BIT RATE: BR | 4 Mbps | 4 Mbps | 4 Mbps | 3 Mbps |
| SAVING PERIOD: T | 14 DAYS | | | |
| NUMBER OF CAMERAS: N | 1 | 2 | 3 | 4 |
| FRAME RATE: FL | 12 FPS | 6 FPS | 4 FPS | 4 FPS |
| BIT RATE: BR | 2 Mbps | 2 Mbps | 2 Mbps | 1.5 Mbps |
| SAVING PERIOD: T | 30 DAYS | | | |
| NUMBER OF CAMERAS: N | 1 | 2 | 3 | 4 |
| FRAME RATE: FL | 6 FPS | 4 FPS | 4 FPS | 4 FPS |
| BIT RATE: BR | 2 Mbps | 1.5 Mbps | 1 Mbps | 0.7 Mbps |

| IMAGE QUALITY PRIORITY MODE: M3 | MAXIMUM SAVING CAPACITY MS = 128 GB | | | |
|---|---|---|---|---|
| SAVING PERIOD: T | 7 DAYS | | | |
| NUMBER OF CAMERAS: N | 1 | 2 | 3 | 4 |
| FRAME RATE: FL | 8 FPS | 4 FPS | 2 FPS | 2 FPS |
| BIT RATE: BR | 6 Mbps | 6 Mbps | 6 Mbps | 4.8 Mbps |
| SAVING PERIOD: T | 14 DAYS | | | |
| NUMBER OF CAMERAS: N | 1 | 2 | 3 | 4 |
| FRAME RATE: FL | 8 FPS | 4 FPS | 2 FPS | 2 FPS |
| BIT RATE: BR | 3 Mbps | 3 Mbps | 3 Mbps | 2.4 Mbps |
| SAVING PERIOD: T | 30 DAYS | | | |
| NUMBER OF CAMERAS: N | 1 | 2 | 3 | 4 |
| FRAME RATE: FL | 4 FPS | 2 FPS | 2 FPS | 2 FPS |
| BIT RATE: BR | 2.8 Mbps | 2.4 Mbps | 1.6 Mbps | 1.2 Mbps |

FIG. 4A

| FRAME RATE: FL | 30 FPS | 20 FPS | 15 FPS |
|---|---|---|---|
| | 10 FPS | 5 FPS | 3 FPS |

FIG. 4B

| MINIMUM BIT RATE BRmin | BRmin = 1.5 Mbps |
|---|---|
| MAXIMUM BIT RATE BRmax | BRmax = 8 Mbps |

FIG. 4C $$\text{BIT RATE BR} = \frac{\text{MAXIMUM SAVING CAPACITY MS} \times 8 \times 1024}{\text{NUMBER OF CAMERAS N} \times (\text{FRAME RATE FL}/30) \times 3600 \times 24 \times \text{SAVING PERIOD T}}$$

FIG. 4D $$\text{SAVING PERIOD T} = \frac{\text{MAXIMUM SAVING CAPACITY MS} \times 8 \times 1024}{\text{NUMBER OF CAMERAS N} \times \text{MINIMUM BIT RATE BRmin} \times (\text{MINIMUM FRAME RATE FL}/30) \times 3600 \times 24}$$

FIG. 4E

| SETTING MODE: M | SELECTION ITEM | SELECTION CRITERION |
|---|---|---|
| MOTION PRIORITY MODE: M2 | MINIMUM BIT RATE BRmin | BRmin = 1.5 Mbps OR MORE |
| IMAGE QUALITY PRIORITY MODE: M3 | MAXIMUM BIT RATE BRmax | BRmax = 8 Mbps OR MORE |
| NORMAL MODE: M1 | AVERAGE VALUE OF FRAME RATES | AVERAGE VALUE OF MAXIMUM FRAME RATE AND MINIMUM FRAME RATE OBTAINED FROM BRmin AND BRmax |

FIG. 5A

| CAMERA NUMBER | CAMERA SETTING ITEM | | |
|---|---|---|---|
| | BIT RATE BR | FRAME RATE FL | RESOLUTION RE |
| C001 | 5 Mbps | 3 FPS | 1920×1080 |
| C002 | 6 Mbps | 2 FPS | 1920×1080 |
| C003 | 4 Mbps | 4 FPS | 1280×720 |

FIG. 5B

| | |
|---|---|
| CURRENT SETTING MODE | M2 (MOTION PRIORITY MODE) |
| CURRENT SAVING PERIOD T | 7 DAYS |
| CURRENT NUMBER OF CAMERAS N | 4 |
| CURRENT MAXIMUM SAVING CAPACITY MS | 128 GB |

FIG. 5C

| | |
|---|---|
| START TIME | 9 A.M. |
| END TIME | 5 P.M. |

FIG. 5D

| CAMERA SETTING ITEM | SETTING CRITERION OF HIGH LOAD TIME ZONE (REDUCTION SETTING NECESSITY TIME ZONE) |
|---|---|
| FRAME RATE FL | CHANGE SETTING TO 80% OF CURRENT FRAME RATE (INTEGER VALUE OBTAINED BY ROUNDING NUMERICAL VALUE DOWN TO NEAREST DECIMAL) |
| RESOLUTION RE | CHANGE SETTING TO RESOLUTION SMALLER THAN CURRENT RESOLUTION (E.G. RESOLUTION RE: 1920×1080 IS CHANGED TO 1280×720) |

FIG. 5E

| CAMERA NUMBER | CAMERA SETTING ITEM | | |
|---|---|---|---|
| | BIT RATE BR | FRAME RATE FL | RESOLUTION RE |
| C001 | 5 Mbps | 2 FPS | 1280×720 |
| C002 | 6 Mbps | 1 FPS | 1280×720 |
| C003 | 4 Mbps | 3 FPS | 800×600 |

FIG. 6A

SETTING INPUT INFORMATION

| SAVING PERIOD: T | 14 DAYS |
|---|---|
| NUMBER OF CAMERAS: N | 4 |
| MAXIMUM SAVING CAPACITY: MS | 512 GB |

| MINIMUM BIT RATE BRmin: 1.5 Mbps |
|---|
| MAXIMUM BIT RATE BRmax: 8 Mbps |

SETTING VALUE

| FRAME RATE: FL | 30 FPS | 20 FPS | 15 FPS | 10 FPS | 5 FPS | 3 FPS |
|---|---|---|---|---|---|---|

CALCULATION VALUE

| BIT RATE: BR | 0.8 Mbps | 1.3 Mbps | 1.7 Mbps | 2.6 Mbps | 5.2 Mbps | 8.6 Mbps |
|---|---|---|---|---|---|---|

FIG. 6B

SETTING INPUT INFORMATION

| SAVING PERIOD: T | 60 DAYS |
|---|---|
| NUMBER OF CAMERAS: N | 4 |
| MAXIMUM SAVING CAPACITY: MS | 256 GB |

| MINIMUM BIT RATE BRmin: 1.5 Mbps |
|---|
| MAXIMUM BIT RATE BRmax: 8 Mbps |

SETTING VALUE

| FRAME RATE: FL | 30 FPS | 20 FPS | 15 FPS | 10 FPS | 5 FPS | 3 FPS |
|---|---|---|---|---|---|---|

CALCULATION VALUE

| BIT RATE: BR | 0.1 Mbps | 0.1 Mbps | 0.2 Mbps | 0.3 Mbps | 0.6 Mbps | 1.0 Mbps |
|---|---|---|---|---|---|---|

IMAGE PROCESSING APPARATUS

BACKGROUND

1. Field

The present disclosure relates to an image processing apparatus, and particularly relates to an image processing apparatus capable of storing an image captured by a camera connected to the image processing apparatus and changing settings of the camera.

2. Description of the Related Art

While an image forming apparatus has been used, a multifunction peripheral having many functions such as not only a function of copying a document but also a function of reading (scanning) a document and a network connection function has been recently used.

For example, there is a case where the multifunction peripheral is connected to a camera via a network such as a LAN, regularly receives an image captured by the camera, saves the image in a storage device, and displays, prints, or performs predetermined image processing on the saved image.

There is also a case where an image capturing apparatus and an information processing apparatus are connected, an image received from the image capturing apparatus is displayed on a display apparatus, and an operation of adjusting an image processing parameter set to the image capturing apparatus is performed by a user while the user views the displayed image.

Further, Japanese Unexamined Patent Application Publication No. 2013-219617 proposes an image capturing system in which an image received from an image capturing apparatus (digital camera) is displayed on a display unit of an information processing apparatus, an operation of adjusting an image processing parameter such as a color adjustment parameter is performed by a user while the user views the displayed image, and the adjusted image processing parameter is stored in a temporary holding region of a storage medium of the information processing apparatus and transmitted to the image capturing apparatus. In a case where it is detected that communication connection with the image capturing apparatus is disconnected and then the information processing apparatus and the image capturing apparatus are reconnected, the user is queried about whether or not to resume the adjustment using the image processing parameter, and in a case where a selection input operation indicating resume of the adjustment is performed by the user, the image processing parameter stored in the temporary holding region is transmitted to the image capturing apparatus.

In the related art, however, setting or adjustment itself of an image processing parameter of a camera is to be performed for each of cameras by the user through a predetermined operation. In addition, the image processing parameter has many adjustment items such as color adjustment and a resolution, so that an input operation for the adjustment is complicated and troublesome. Further, in a case where there are many cameras that are connected, a work of the adjustment takes time and an operation burden on the user is very large.

In Japanese Unexamined Patent Application Publication No. 2013-219617, in a case where communication connection with the image capturing apparatus is disconnected during the adjustment of the image capturing apparatus and the adjustment of the image processing parameter is not allowed, when the communication connection with the image capturing apparatus is resumed, the image processing parameter stored in the temporary holding region of the storage medium of the information processing apparatus is transmitted to the image capturing apparatus, and therefore it is unnecessary to perform the adjustment of the image processing parameter again from the beginning. However, setting or adjustment itself of the image processing parameter is to be performed for each of cameras by the user through a predetermined operation, and an operation burden on the user is large as well.

Further, in a multifunction peripheral having a function of receiving data of a moving image captured by a camera and saving the moving image data in a storage device, when it is assumed that a storage capacity of the storage device is limited and a storage region in which data of a moving image captured by the camera is able to be saved is fixedly set in advance in the storage device, an image processing parameter such as image quality or a resolution is requested to be set in consideration of also a storage capacity of the storage region and the number of days for which saving is allowed, to avoid a case where storage of the received moving image data is not allowed.

For example, when intending to save moving image data from four cameras for 7 days in a 100-gigabyte storage region of the multifunction peripheral, the user is requested to perform processing of setting an image processing parameter while predicting an information quantity of moving image data for one frame and considering also image quality or the like to enable the moving image data for 7 days to be saved in the storage region, and transmitting the set image processing parameter to each of the cameras. Accordingly, it takes a lot of time for the user to set the image processing parameter and a processing burden on the user is large.

Thus, the disclosure is made in view of circumstances as described above and provides an image processing apparatus that enables a user to, when setting a setting content of a setting item of a camera connected via a network, easily set the setting item in consideration of not only image quality of moving image data but also a storage capacity of a storage region in which the moving image data is stored, so as to achieve reduction of time of a work of setting the setting item, and reduce an operation burden on a user in the setting work.

SUMMARY

The disclosure provides an image processing apparatus including a moving image data acquisition unit that acquires moving image data from one or more cameras connected via a network, a storage unit that stores the moving image data that is acquired and camera image related information used to generate a camera setting content of a setting item related to image capturing of a camera, a camera setting change unit that generates or changes the camera setting content associated with the camera image related information that is stored, and a camera setting transmission unit that transmits, to the camera, the camera setting content that is generated, in which the camera image related information includes at least a saving period in which the moving image data is saved in the storage unit.

The disclosure provides an image processing system constituted by an image processing apparatus and a camera that are connected to a network, the image processing apparatus including a first communication unit that communicates with one or more cameras, a moving image data acquisition unit that acquires moving image data from the camera connected via the network, a storage unit that stores the moving image data that is acquired and camera image related information used to generate a camera setting content of a setting item related to image capturing of the camera, a camera setting change unit that generates or changes the camera setting content associated with the camera image related information that is stored, and a camera setting transmission unit that transmits, to the camera, the camera setting content that is generated, the camera including a second communication unit that communicates with the image processing apparatus, and an image storage unit that stores moving image data that is captured and the camera setting content transmitted from the image processing apparatus, in which the camera image related information includes at least a saving period in which the moving image data is saved in the storage unit, the camera setting change unit generates a camera setting content associated with the saving period, the camera setting transmission unit transmits, to the camera, the camera setting content that is generated, and the camera stores the camera setting content that is received in the image storage unit, captures a moving image based on the camera setting content that is stored, and causes the second communication unit to transmit data of the moving image that is captured to the image processing apparatus.

The disclosure provides a method of setting a camera setting content of an image processing system, the image processing system being constituted by an image processing apparatus and a camera that are connected to a network, the image processing apparatus including a first communication unit that communicates with one or more cameras, a moving image data acquisition unit that acquires moving image data from the camera connected via the network, a storage unit that stores the moving image data that is acquired and camera image related information used to generate a camera setting content of a setting item related to image capturing of the camera, a camera setting change unit that generates or changes the camera setting content associated with the camera image related information that is stored, and a camera setting transmission unit that transmits, to the camera, the camera setting content that is generated, the camera including a second communication unit that communicates with the image processing apparatus, and an image storage unit that stores moving image data that is captured and the camera setting content transmitted from the image processing apparatus, in which, as the camera image related information, at least a saving period in which the moving image data is saved in the storage unit is input to the image processing apparatus, the camera setting change unit generates a camera setting content associated with the saving period, the camera setting transmission unit transmits, to the camera, the camera setting content that is generated, and the camera stores the camera setting content that is received in the image storage unit, captures a moving image based on the camera setting content that is stored, and causes the second communication unit to transmit data of the moving image that is captured to the image processing apparatus.

BRIEF DESCRIPTION OF THE DRAWINGS

FIG. 2 is an explanatory view illustrating an example of a camera setting item set in the image processing apparatus of the disclosure;

FIGS. 3A to 3C are explanatory views each illustrating an example of camera setting information stored in the image processing apparatus of the disclosure;

FIGS. 4A to 4E are explanatory views each illustrating an example of information stored in advance in a storage unit of the image processing apparatus of the disclosure;

FIGS. 5A to 5E are explanatory views each illustrating an example of information stored in the storage unit of the image processing apparatus of the disclosure;

FIGS. 6A and 6B are explanatory views each illustrating an example of information that is input, set, and calculated in the image processing apparatus of the disclosure;

DESCRIPTION OF THE EMBODIMENTS

Embodiments of the disclosure will be described below with reference to the drawings. Note that, the disclosure is not limited by description of the following examples.

<Configuration of Image Processing Apparatus>

Figure 1:
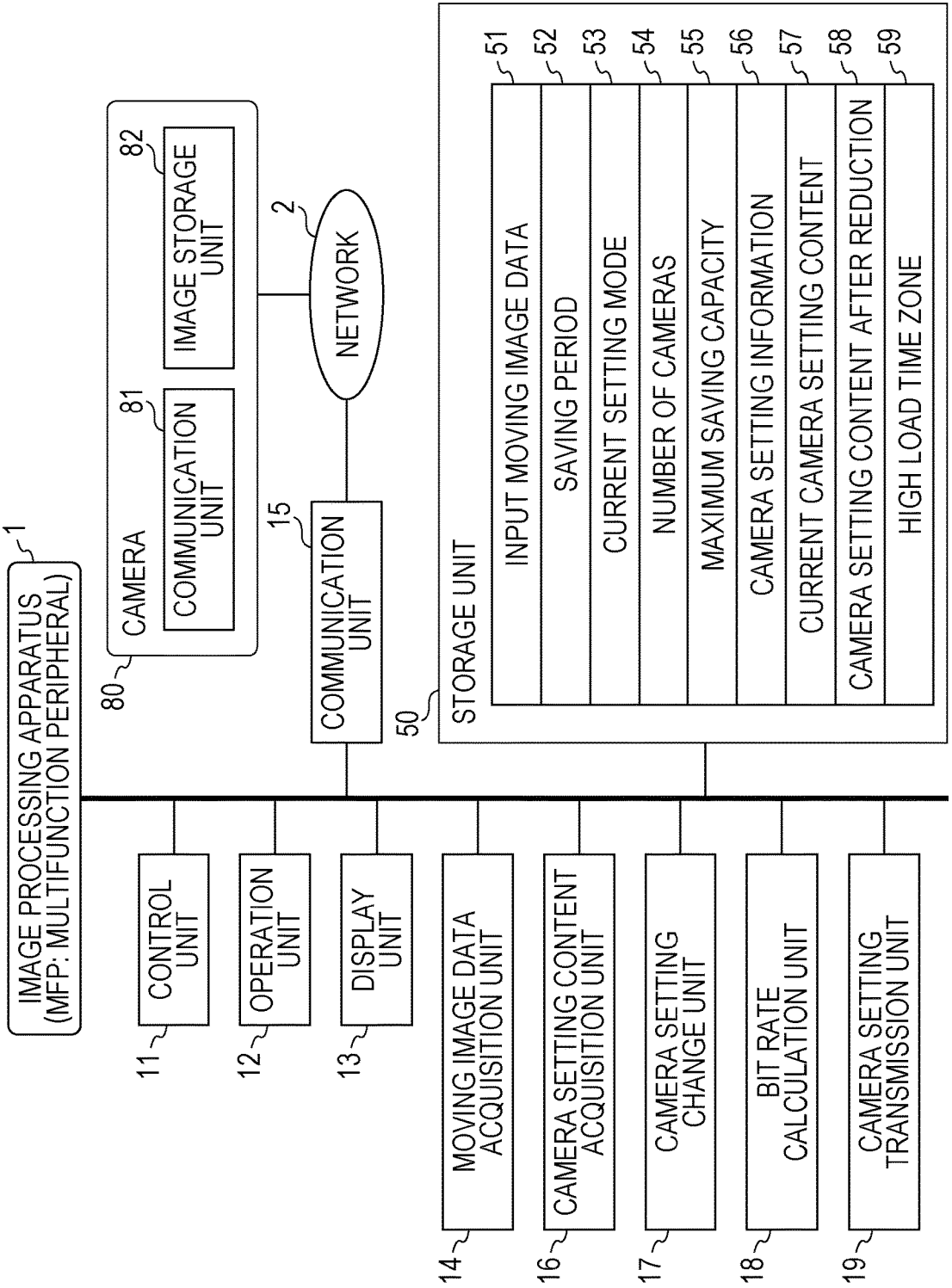
FIG. 1 is a structural block diagram of an example of an image processing apparatus of the disclosure.

FIG. 1 is a structural block diagram of an example of an image processing apparatus of the disclosure.

An image processing apparatus (hereinafter, also referred to as a multifunction peripheral (MFP)) 1 is an apparatus that processes image data and is electronic equipment that has, for example, a copying function, a printing function, a document reading function (scanning function), a camera image acquisition function, a camera setting function, a facsimile function, and a communication function. A moving image and a still image are cited as an image captured by a camera, and in the disclosure, in particular, data of a moving image captured by the camera is acquired and stored, and the moving image data is subjected to image processing.

In particular, the image processing apparatus of the disclosure has a moving image data acquisition function of receiving captured moving image data from one or more cameras connected via a network and saving the moving image data in a predetermined storage region in a storage device, and a camera setting function of setting a setting item (item by which image quality of an image to be captured or the like is decided) related to image capturing of a camera on the basis of a predetermined setting criterion and transmitting a setting content of the setting item, which is set, to the camera.

With the camera setting function, a user may set the setting item of the camera as occasion demands by performing a predetermined input operation, but in the disclosure, to facilitate a work of setting the setting item of the camera and reduce a time therefor, for example, camera setting information as described later is stored in advance and a setting content (setting value) of the setting item that may correspond to camera image related information, such as a saving period, which is input and acquired is automatically selected from the camera setting information.

Moreover, in a case where a maximum value (maximum saving capacity) of a storage capacity to save data of a moving image captured by the camera is decided in the image processing apparatus, when the number of cameras that are connected, a saving period of the moving image data, and a setting mode to distinguish an image-capturing situation of the camera are set, a setting value of the setting item related to image quality or the like of the moving image data to be saved within the maximum saving capacity is also able to be decided on the basis of a predetermined selection criterion. The setting mode is constituted by some image-capturing modes to distinguish the image-capturing situation of the camera and includes, for example, a motion priority mode, an image quality priority mode, and a normal mode as described later.

For example, when it is desired to set image quality of each moving image to be captured to high image quality, the setting mode of the camera is set to the image quality priority mode and a relatively large numerical value is set to a bit rate which is one of setting items of the camera. When an excessively large numerical value is set to the bit rate, however, there is a case where an information quantity of each moving image data increases because of high image quality and the moving image data for a saving period that is set is not able to be saved within a maximum storage capacity.

Thus, a relatively large bit rate among bit rates obtained by a calculation formula indicating the predetermined selection criterion is set in consideration of the maximum saving capacity, the number of cameras, and the saving period as described later.

In a case where it is desired to check a motion of an object included in captured moving image data as smoothly as possible, the setting mode of the camera is set to the motion priority mode, and, even though image quality is slightly lowered, a relatively large numerical value is set to a frame rate which is one of the setting items of the camera. When a large numerical value is set to the frame rate, however, there is a case where the moving image data for the saving period that is set is not able to be saved within the maximum storage capacity.

Thus, similarly, the bit rate is calculated by the calculation formula indicating the predetermined criterion in consideration of the maximum saving capacity, the number of cameras, and the saving period, and the frame rate corresponding to the bit rate which indicates allowable image quality is set.

The camera image related information is information to generate a camera setting content of the setting item related to image capturing of the camera and is information input by the user or information stored in a storage unit in advance. For example, the camera image related information includes at least the saving period in which moving image data is saved in the storage unit, and further includes the number of cameras, the maximum saving capacity of the storage region in which the moving image data is stored, and the setting mode to distinguish the image-capturing situation of the camera.

The setting mode of the camera and the saving period of the moving image data are to be decided in accordance with a circumstance of the user who uses the image processing apparatus, and are thus information that is input through a predetermined input operation by the user with use of an operation unit described later.

Further, the maximum saving capacity of the moving image data and the number of cameras connected to the image processing apparatus may be increased or decreased later depending on a situation, but when the image processing apparatus is actually operated, in principle, the maximum saving capacity and the number of cameras are information to be fixedly set and stored in the storage unit in advance. That is, the maximum saving capacity and the number of cameras are able to be read out from the storage unit and acquired. However, the maximum saving capacity and the number of cameras may be also input in advance through a predetermined input operation by the user.

FIG. 2 is an explanatory view illustrating an example of a camera setting item set in the image processing apparatus of the disclosure. The camera setting item is a setting item related to image capturing of the camera and is a setting item by which image quality or the like of image data (mainly, moving image data) to be captured by the camera is decided. The camera setting item has many items and includes items as illustrated in FIG. 2, for example. In FIG. 2, the camera setting item mainly includes an item for stream setting and an item for camera adjustment. As the item for stream setting, for example, there are a video resolution, a bit rate (BR), and a frame rate (FL). As the item for camera adjustment, for example, there are exposure, a white balance, image adjustment (luminance, sharpness, contrast, saturation, and coloration), noise reduction, and the like.

In the disclosure, the camera image related information (for example, the setting mode, the saving period, the maximum saving capacity, or the number of cameras) to generate the camera setting content of the setting item related to image capturing of the camera is stored in the storage unit, and the camera setting content associated with the camera image related information that is stored is generated or changed.

In particular, in consideration of the current setting mode of the camera (hereinafter, also referred to as a current setting mode or an image-capturing mode) and the saving period, which are input by the user as described above, and the maximum saving capacity and the number of cameras, which are stored in advance in the storage unit, the camera setting content of all the camera setting items listed as examples in FIG. 2 or any one or more camera setting items is automatically generated or changed.

In the following example, for simplification of description for setting processing of a camera setting item, a case where a bit rate (BR) and a frame rate (FL) are set among the camera setting items will be described. The other camera setting items are also able to be automatically set in a similar manner in consideration of the setting mode, the saving period, the maximum saving capacity, the number of cameras, and the like which are input or acquired.

In FIG. 1, the image processing apparatus (MFP) 1 of the disclosure mainly includes a control unit 11, an operation unit 12, a display unit 13, a moving image data acquisition unit 14, a communication unit 15, a camera setting content acquisition unit 16, a camera setting change unit 17, a bit rate calculation unit 18, a camera setting transmission unit 19, and a storage unit 50.

An image processing system of the disclosure is constituted by the image processing apparatus (MFP) 1 and a camera 80 which are connected to a network.

The image processing apparatus (MFP) 1 and the camera 80 are connected via a network 2.

The camera 80 connected to the image processing apparatus (MFP) 1 may be one or more. The network 2 may be any existing network, and may be, for example, a LAN, the Internet, or a dedicated line. Communication may be performed by any form of wired communication and wireless communication.

The camera 80 includes a communication unit 81, which communicates with the image processing apparatus 1, and an image storage unit 82, in addition to an image capturing unit (not illustrated) that is a basic function and captures an image. The image capturing unit is a unit that generates a still image or moving image data, constituted by a semiconductor imaging element such as a CCD or a CMOS, and mainly converts digitized image information into frame data for each pixel and outputs compressed moving image data by using consecutive frame data. The image capturing unit also captures an image on the basis of the camera setting content stored in the image storage unit 82. The communication unit 81 corresponds to the second communication unit described above and is a unit that transmits captured moving image data to the image processing apparatus 1. The communication unit 81 also receives the camera setting content of the setting item related to image capturing of the camera, which is transmitted from the image processing apparatus 1.

The image storage unit 82 of the camera 80 is a unit that stores captured moving image data, and the camera setting content transmitted from the image processing apparatus. As the image storage unit 82, for example, a semiconductor storage element such as a RAM or a flash memory, a storage medium, or a storage device such as an HDD or an SSD is used. The camera setting content is desirably stored in a non-volatile memory such as a flash memory. Information of a captured image is also desirably stored in a non-volatile memory, but may be stored in a volatile memory when it is premised that the information is transferred to the image processing apparatus.

The control unit 11 of the image processing apparatus 1 is a unit that controls operations of components such as the communication unit and is mainly realized by a microcomputer constituted by a CPU, a ROM, a RAM, an I/O controller, a timer, and the like.

The CPU organically operates various kinds of hardware on the basis of a control program stored in the ROM or the like in advance and executes the moving image data acquisition function, a camera setting transmission function, or the like of the disclosure. In particular, the camera setting change unit 17 and the bit rate calculation unit 18 are functional blocks executed through software by the CPU on the basis of a predetermined program.

The operation unit 12 is a unit by which the user inputs information and is used to input information such as a character, a selection input of a function, an input of a setting item used to execute the function, or the like. As the operation unit 12, for example, a keyboard, a mouse, a touch panel, or the like is used. In the disclosure, desired information is input by the user with use of the operation unit 12 to set the camera setting item used for image capturing of the camera. For example, the user inputs the saving period of moving image data or the setting mode of the camera as described later.

In a case where a plurality of cameras are connected to the image processing apparatus 1, when the user is able to designate a camera to use, the user may set and input the number of cameras or the camera to be used. Further, the user may set and input the saving period of captured moving image data or the setting mode for each of the cameras. Further, in a case where the user is able to designate a capacity of a storage region of the moving image data to be saved in the storage unit of the image processing apparatus 1, the user may set and input a maximum saving capacity of the storage region.

The display unit 13 is a unit that displays information, and displays information used for execution of each of functions, a result of execution of the function, or the like to notify the user of that. For example, the setting item to be set and input by the user is displayed, the camera setting content to be transmitted to the camera is displayed, or a caution is displayed to indicate that there is no appropriate camera setting content. As the display unit 13, for example, an LCD, an organic EL display, or the like is used. In a case where a touch panel is used as the operation unit 12, the display unit and the touch panel are arranged being overlapped with each other.

The moving image data acquisition unit 14 is a unit that acquires moving image data transmitted from one or more cameras connected via the network, and saves the acquired moving image data in the storage unit 50 as input moving image data 51. In a case where a plurality of cameras are connected, the moving image data is saved as input moving image data with an identification number of a camera added for each of the cameras.

The communication unit 15 corresponds to the first communication unit described above and is a unit that communicates with one or more cameras or another communication apparatus via the network 2. For example, the communication unit 15 receives moving image data transmitted from the camera as described above. The communication unit 15 transmits, to the camera, information to request the setting content of the camera setting item currently set to the camera, and receives the setting content of the camera setting item transmitted from the camera. The communication unit 15 also transmits, to the camera, the camera setting content set in the image processing apparatus of the disclosure. For data communication with the camera or another communication apparatus, any existing communication network, for example, a wide area communication network such as the Internet or a LAM is able to be used, and either-wired communication or wireless communication may be used.

The camera setting content acquisition unit 16 is a unit that acquires, from the camera, the setting content (camera setting content) of the camera setting item currently set to the camera. As described above, the camera setting content used for image capturing is stored in the image storage unit 82 of the camera. The camera setting content acquisition unit 16 transmits, to the camera, information (setting request information) to request acquisition of the camera setting content, acquires, as a response to the setting request information, the camera setting content transmitted from the camera, and stores the camera setting content in the storage unit 50 as a current camera setting content 57.

The current camera setting content 57 is, for example, information used to return to an original normal operation state from a high load time zone (reduction setting necessity time zone) as described later. The high load time zone means a time zone in which a function (hereinafter, also referred to as another function) other than a function of image processing using moving image data acquired from the camera is frequently used in the image processing apparatus. Examples of the function of image processing using moving image data include a function of acquiring moving image data, a moving object detection function, and a function of acquiring a still image when a moving object is detected.

In the high load time zone, to prioritize processing of another function, a moving image is captured with reducing a capability allocated to the function of image processing using moving image data, for example, with changing the camera setting content to reduce a frame rate. To the contrary, in a time zone (for example, nighttime) in which another function is less frequently used, since the capability allocated to the function of image processing using moving image data is able to be increased, a moving image is captured with changing the camera setting content to increase a frame rate, for example, so that moving image data of a smooth motion is able to be acquired. An example of camera setting processing in the high load time zone will be described later.

The camera setting change unit 17 is a unit that generates or changes the camera setting content associated with the camera image related information stored in the storage unit 50. In a case where a plurality of cameras are connected, the camera setting change unit 17 may, for example, collectively generate the same camera setting content for all the cameras or generate different camera setting contents for the respective cameras.

For example, in a case where camera setting information 56 constituted by the camera setting content of each of the setting items associated with the saving period of moving image data, the number of cameras, the setting mode, and the maximum saving capacity in advance is stored in the storage unit 50 in advance, the camera setting change unit 17 searches the camera setting information 56 to select the camera setting content of the setting item corresponding to the saving period and the setting mode that are input and the number of cameras and the maximum saving capacity that are read out from the storage unit 50. The selected camera setting content is transmitted to the camera by the camera setting transmission unit 19 described later.

That is, in consideration of the camera image related information, such as the setting mode of the camera, which is input or acquired, the camera setting change unit 17 automatically selects the setting content (setting value) of the camera setting item that may correspond to the camera image related information, which is obtained by input or the like, from the camera setting information 56 stored in the storage unit 50 in advance, and generates or changes the camera setting content. An example that the camera setting content of the camera setting item is obtained by generation or the like will be described later.

The bit rate calculation unit 18 is a unit that calculates a bit rate BR, which is one of the camera setting items, by using a predetermined calculation formula. An example of the calculation formula (bit rate calculation formula) by which the bit rate BR is calculated is illustrated in FIG. 4C described later. In the bit rate calculation formula of FIG. 4C, the saving period that is input, the number of cameras and the maximum saving capacity that are read out from the storage unit 50, and the frame rate are variables. In the bit rate calculation formula, the maximum saving capacity, the number of cameras, and the saving period that are obtained by input or the like, and some frame rate selection values that are selected are used to calculate the bit rate BR. On the basis of predetermined selection criterion information, an appropriate bit rate BR that satisfies the criterion is selected from among a plurality of bit rates BR that are calculated. Accordingly, the setting content of the bit rate BR which is one of the camera setting items is generated or changed.

The camera setting transmission unit 19 is a unit that transmits, to the camera, the setting content (camera setting content) of the camera setting item, which is obtained by generation or the like by the camera setting change unit 17. For example, the changed camera setting content of all or a part of the camera setting items as illustrated in FIG. 2 is transmitted to the camera. In the camera 80 having received the changed camera setting content, the received camera setting content is stored in the image storage unit 82, the setting item is set again on the basis of the stored camera setting content, moving image is captured, and data of the captured moving image is transmitted to the image processing apparatus.

As the image processing apparatus 1 of FIG. 1, various information processing apparatuses such as an image forming apparatus, a personal computer, a server, and a mobile terminal are able to be used.

In a case where an image forming apparatus is used as the image processing apparatus 1, the image forming apparatus may include, in addition to the configuration illustrated in the figure, an image input unit and an output unit that a general image forming apparatus have.

The image input unit is a unit that inputs, as image data, information described in a document, and corresponds to a scanner (reading device) that reads the document in which the information is described.

The output unit is a unit that outputs generated image information, and corresponds to a printer that prints and outputs the image information to a paper medium, for example.

The output of information is not limited to printing and may be storage of information in an external storage medium such as a USB memory, display of information on the display unit, or transmission of information to another information processing apparatus or a server via a network such as the Internet.

The storage unit 50 is a unit that stores information and a program that are used to execute each function of the image processing apparatus of the disclosure and a semiconductor storage element, such as a ROM, a RAM, or a flash memory, a storage device, such as an HDD or an SSD, or another storage medium is used therefor.

In the storage unit 50, for example, the input moving image data 51, a saving period 52, a current setting mode 53, the number of cameras 54, a maximum saving capacity 55, camera setting information 56, the current camera setting content 57, a camera setting content after reduction 58, a high load time zone 59, and the like are stored. Here the saving period 52, the current setting mode 53, the number of cameras 54, and the maximum saving capacity 55 are information included in the camera image related information used to generate the camera setting content of the setting item related to image capturing of the camera.

The input moving image data 51 is data of a moving image captured by the camera and data of a moving image acquired by the moving image data acquisition unit 14. In a case where a plurality of cameras are connected, the input moving image data 51 is stored discriminately for each of the cameras. In addition, the input moving image data 51 is stored so as not to exceed the maximum saving capacity that is set in advance to save data of a moving image captured by the camera. Further, the input moving image data 51 is stored for each of the cameras in the saving period that is set and input, and old data that has passed the saving period is sequentially erased.

The saving period 52 is a period in which the input moving image data 51 is saved in the storage unit 50. The saving period 52 is information that is set and input by the user, but that may be a fixed numerical value stored in advance. In a case where a plurality of cameras are connected, saving periods different from each other may be set to the respective cameras or the same saving period may be set to all the cameras. The saving period 52 may be set on a day basis, for example, such as 10 days or 20 days, or a numerical value on a month basis or on a time basis may be set. In a case where the maximum saving capacity 55 with which moving image data is able to be stored is known, in consideration of the maximum saving capacity 55, an upper limit may be set on the saving period 52 that is able to be set or some numbers of days that are able to be set may be displayed as options so that the user is allowed to select and input the desired number of days.

The current setting mode 53 means a mode related to the current image-capturing situation of the camera and is information set and input by the user. In a case where a plurality of cameras are connected, current setting modes different from each other may be set to the respective cameras or the same current setting mode may be set to all the cameras.

As the current setting mode 53, for example, any of three modes of the motion priority mode, the image quality priority mode, and the normal mode is set.

The motion priority mode is a mode in which a moving image is captured so that a motion of an object included in the captured image is able to be displayed relatively smoothly, and in the mode, for example, a relatively large numerical value is set to the frame rate. In addition, as described later, in a case where the setting mode that is input is the motion priority mode, for example, among a plurality of bit rates obtained by substituting a plurality of frame rates into the bit rate calculation formula, a bit rate which is a predetermined minimum bit rate or more and has a smallest value and a frame rate used when the bit rate is calculated may be included in the camera setting content to be transmitted to the camera.

The image quality priority mode is a mode in which a moving image having relatively high image quality is captured, and in the mode, for example, a relatively large numerical value is set to the bit rate, and additionally, the resolution may be set to a high resolution. In addition, as described later, in a case where the setting mode that is input is the image quality priority mode, among a plurality of bit rates obtained by substituting a plurality of frame rates into the bit rate calculation formula, a bit rate which is a predetermined maximum bit rate or more and has a smallest value and a frame rate used when the bit rate is calculated may be included in the camera setting content to be transmitted to the camera.

The normal mode is a mode in which both a motion of an object and image quality are set in a well-balanced manner. Since the normal mode is a mode in which moving image data intermediate between the motion priority mode and the image quality priority mode is acquired, as the bit rate and the frame rate, average values of those of the motion priority mode and the image quality priority mode may be set, for example.

In the following example, description will be given by assuming that any of the three modes is set to the current setting mode 53.

The number of cameras 54 is the number of cameras connected to the image processing apparatus 1 and it is desirable that the number of cameras 54 is mainly set in advance in a fixed manner. In addition, in a case where the number of cameras connected to the image processing apparatus 1 is increased or decreased, such as a case where a camera is additionally connected, the user or a person making connection of the camera may set and input the number of cameras 54. Alternatively, each identification number may be stored in advance for each of the cameras, information communication to check connection may be regularly performed between the image processing apparatus 1 and the camera, and the number of cameras whose connection has been confirmed may be automatically set and stored as the number of cameras 54.

The maximum saving capacity 55 is a part of the storage capacity of the storage unit 50 of the image processing apparatus 1 and is the capacity of the storage region in which moving image data is stored. That is, the maximum saving capacity 55 is a storage capacity that is able to be used to save the input moving image data 51 acquired from the camera. For example, even in a case where the storage capacity of the storage unit 50 is 1 terabyte, when the storage capacity that is able to be used to save the input moving image data 51 is 256 gigabyte, 256 gigabyte is set and stored in advance as the maximum saving capacity 55. Though the maximum saving capacity 55 may be set fixedly in advance when the image processing apparatus 1 is installed, the user may be allowed to change the setting in accordance with a use situation of another function executed by the image processing apparatus 1.

As the maximum saving capacity 55 is increased, data of a moving image captured with a higher bit rate and a higher frame rate is able to be saved and a longer saving period is able to be set. However, since the maximum saving capacity 55 is limited, it is desirable that, when once the current setting mode 53, the number of cameras 54, and the saving period 52 are set, in consideration of information of the current setting mode 53, the number of cameras 54, and the saving period 52, including information of the maximum saving capacity 55, the setting content of the camera setting item such as the bit rate is automatically set on the basis of the predetermined selection criterion.

FIG. 5B is an explanatory view illustrating an example of the current setting mode (M) 53, the maximum saving capacity (MS) 55, the saving period (T) 52, and the number of cameras (N) 54 that are stored in the storage unit 50. As described above, mainly, the current setting mode (M) 53 and the saving period (T) 52 are information input by the user and the maximum saving capacity (MS) 55 and the number of cameras (N) 54 are information set in advance.

The camera setting information 56 is information in which the setting content of the camera setting item is fixedly set and stored in advance and is, for example, information as illustrated in FIGS. 3A to 3C. FIGS. 3A to 3C are explanatory views each illustrating an example of camera setting information stored in the image processing apparatus. FIGS. 3A to 3C each illustrate the setting content of the frame rate (FL) and the bit rate (BR) that are camera setting items. Here, the frame rate (FL) and the bit rate (BR) that are considered to be appropriate are stored correspondingly to the current setting mode 53, the maximum saving capacity 55, the saving period 52, and the number of cameras 54. Numerical values of such a frame rate (FL) and a bit rate (BR) are decided in advance, for example, so as to satisfy minimum setting by which moving image data is able to be saved in the saving period within the maximum saving capacity.

FIG. 3A illustrates camera setting information when the current setting mode 53 is a normal mode M1, FIG. 3B illustrates camera setting information when the current setting mode 53 is a motion priority mode M2, and FIG. 3C illustrates camera setting information when the current setting mode 53 is an image quality priority mode M3.

In FIGS. 3A to 3C, a case where 128 gigabyte (GB) is set to the maximum saving capacity (MS) 55, and 7 days, 14 days, and 30 days are set to the saving period (T) 52 is indicated. Further, respective numerical values of the frame rate (FL) and the bit rate (BR) that are considered to be appropriate when the number of cameras (N) 54 is 1 to 4 are indicated. Note that, the frame rate (FL) and the bit rate (BR) indicated in the figures are examples and it is not requested that the numerical values are necessarily adopted.

For example, in a case where the current setting mode 53 stored in the storage unit 50 is the normal mode M1, the maximum saving capacity MS is 128 GB, the saving period T is 7 days, and the number of cameras N is 1, 10 FPS is selected as the frame rate (FL) and 5 Mbps is selected as the bit rate (BR) from the camera setting information 56 of FIG. 3A.

When the camera setting information 56 as illustrated in FIGS. 3A to 3C is stored in the storage unit in advance, only by inputting at least the current setting mode 53 and the saving period T that are desired by the user without directly inputting the numerical values of the frame rate (FL) and the bit rate (BR) by himself or herself, the frame rate (FL) and the bit rate (BR) that are the camera setting items are selected easily in a short time while the maximum saving capacity MS and the number of cameras N that are stored in advance are also considered, and an operation burden on the user in a work of setting the camera setting items is able to be reduced.

In addition, FIGS. 3A to 3C each illustrate a case where the maximum saving capacity MS is 128 GB, but in a case where the maximum saving capacity MS is set to be doubled to 256 GB, for example, the camera setting information 56 in which the numerical values of the frame rate (FL) and the bit rate (BR) are not changed and the saving period T is doubled may be created. Moreover, when the number of days of the saving period T is not changed, the maximum saving capacity MS is doubled and even moving image data having somewhat high image quality is able to be stored, so that the camera setting information 56 in which, for example, the bit rate (BR) is set to a numerical value increased by 10% may be created.

In addition, in the same setting mode in FIGS. 3A to 33, as the saving period T becomes long, a data quantity per one piece of moving image data is to be reduced, so that it is desirable that, as the saving period T becomes long, a small value is set to both of the frame rate (FL) and the bit rate (BR). Further, as the number of cameras N increases, the data quantity per one piece of moving image data is to be reduced, so that it is desirable that, as the number of cameras N increases, a small value is set to both of the frame rate (FL) and the bit rate (BR).

In a case of the motion priority mode M2 of FIG. 3B, to enable confirmation of a smooth motion, when the maximum saving capacity MS, the saving period T, and the number of cameras N are the same as those in the normal mode M1 of FIG. 3A, a larger numerical value is set to the frame rate (FL) than in the normal mode M1. Further, in a case of the image quality priority mode M3 of FIG. 3C, to output moving image data having high image quality, when the maximum saving capacity MS, the saving period T, and the number of cameras N are the same as those in the normal mode M1 of FIG. 3A, a larger numerical value is set to the bit rate (BR) than in the normal mode M1 of FIG. 3A.

As described above, the current camera setting content 57 is the setting content (camera setting content) of the setting item currently set to the camera and is information mainly acquired by the camera setting content acquisition unit 16 from the camera. As the current camera setting content 57, a setting value of each of the camera setting items, which is currently set to the camera as illustrated in FIG. 2, for example, is stored. In a case where a plurality of cameras are connected, the current camera setting content 57 is stored for each of the cameras.

FIG. 5A is an explanatory view illustrating an example of the current camera setting content 57. In FIG. 5A, the setting content of three camera setting items are indicated for each of three cameras. This means that, for example, for a camera with a camera number C001, currently, 5 Mbps is set as the bit rate (BR), 3 FPS is set as the frame rate (FL), and 1920×1080 is set as the resolution (RE). The current camera setting content 57 may be saved in the storage unit 50 at all times, but may be acquired from the camera as requested or regularly and saved in the storage unit 50 temporarily, or may be erased from the storage unit 50 when unnecessary.

The camera setting content after reduction 58 is the camera setting content of the setting item that is set to the camera in the high load time zone. Since the high load time zone is a time zone in which another function of the image processing apparatus is frequently used, a capability allocated to a function of processing moving image data acquired from the camera is reduced in the high load time zone.

For example, in a case where the image processing apparatus has the moving object detection function of detecting a moving object by using a plurality of pieces of moving image data acquired in a fixed time and specifying the object from a motion of the object, a capability of the moving object detection function is reduced in the high load time zone. That is, a load applied to execute the moving object detection function is reduced and a load applied to execute another function is increased.

The high load time zone is also called a reduction setting necessity time zone from a viewpoint of reducing a load of image processing using moving image data as in the moving object detection function. In a case where a current time is in the high load time zone, the camera setting change unit 17 changes the camera setting content of the setting item related to image capturing of the camera so as to reduce a load applied to execute image processing using moving image data.

For example, in the high load time zone, to reduce the capability allocated to image processing of moving image data as in the moving object detection function or the like so that another function is able to be preferentially executed, the setting content of any camera setting item is changed mainly so as to reduce smoothness of moving image data to be acquired. In this case, the frame rate FL is reduced and a time interval in which the moving object detection function or the like is performed is lengthened. Further, the resolution RE may be set to be low.

FIG. 5E is an explanatory view illustrating an example of the camera setting content after reduction 58. In FIG. 5E, similarly to FIG. 5A, the setting content of three camera setting items is indicated for each of three cameras. When the high load time zone has come, the setting content of the camera is changed from the setting content of FIG. 5A to the setting content of FIG. 5E. FIG. 5E indicates a case where the frame rate FL is reduced and the resolution RE is set to be low compared to the setting content of FIG. 5A, to reduce the load of image processing using moving image data.

The high load time zone 59 is a time zone in which another function of the image processing apparatus is frequently used as described above and is set and input by the user in advance.

FIG. 5C is an explanatory view illustrating an example of the high load time zone (TZ) 59. Here, the high load time zone TZ (reduction setting necessity time zone) in which a start time and an end time of the high load time zone are set is indicated. As the high load time zone (TZ), not only one time zone but two or more time zones may be set and information indicating not a time but a date, a day of a week, a season, or the like may be set.

Further, the high load time zone TZ may not be fixedly set. For example, a use frequency, an average operation rate, and the like every past fixed time in the image processing apparatus may be measured and the setting of the high load time zone TZ may be dynamically changed by using the measured average operation rate. For example, a time zone in which the average operation rate is greater than a predetermined comparison setting rate may be set as the high load time zone TZ.

In addition, in a case where the image processing apparatus is an image forming apparatus, the image forming apparatus is switched to a power saving state (sleep state) in a state of being not used for a fixed time or more.

Thus, the image forming apparatus may be configured so that the camera setting content is set to the aforementioned camera setting content after reduction 58 in a normal operation state similarly to the case of the high load time zone TZ, and the high load time zone TZ automatically ends in an interlocking manner when the image forming apparatus is switched to the sleep state, and the setting content of the camera is changed from the camera setting content after reduction 58 to the current camera setting content 57.

To the contrary, when use of the image forming apparatus is resumed and the image forming apparatus is returned from the sleep state to the normal operation state, the camera setting content may be changed to the camera setting content after reduction 58 similarly to the case of the high load time zone TZ.

In the storage unit 50, in addition to the information described above, various kinds of information may be set or stored in advance as requested. For example, numerical value information and criterion information as follows may be stored in advance, or may be used as a condition or a numerical value of each step in a program that realizes camera setting processing of the disclosure.

FIG. 4A is an explanatory view illustrating an example of a frame rate selection value. The frame rate selection value is a numerical value of the frame rate used to calculate the bit rate by the bit rate calculation formula. The frame rate is a setting item used when a moving image is captured, and means here a frame rate selected as some candidates when the bit rate is decided by the bit rate calculation formula, in accordance with a relationship with the maximum storage capacity or the like. By substituting each of frame rate selection values into the bit rate calculation formula, one bit rate is calculated. Though six frame rates FL (30 FPS to 3 FPS) are indicated in FIG. 4A, there is no limitation to the six numerical values.

FIG. 4B is an explanatory view illustrating an example of setting bit rate range information. The setting bit rate range information is information indicating a condition under which the bit rate is decided, and a minimum bit rate BRmin and a maximum bit rate BRmax are mainly set and stored. In FIG. 4B, 1.5 Mbps is set as the minimum bit rate BRmin and 8 Mbps is set as the maximum bit rate BRmax. In general, a lower bit rate exhibits low image quality and a higher bit rate exhibits high image quality. For example, in the motion priority mode, even a slightly low bit rate is allowed, so that a bit rate which is the minimum bit rate BRmin or more and is closest to the minimum bit rate BRmin is selected from among the six bit rates calculated from the frame rate selection values described above.

FIG. 4C is an explanatory view illustrating an example of the bit rate calculation formula. The bit rate calculation formula is used to calculate the bit rate BR by using the maximum saving capacity MS, the number of cameras N, and the saving period T which are stored in the storage unit 50, and some frame rate selection values which are selected. In the bit rate calculation formula, 8 means changing a unit of a data size from byte to bit, 1024 means changing the unit of the data size from giga to mega, 30 means that a reference frame rate of the bit rate BR is 30, 3600 means changing a time unit from time to second, and 24 means changing a time unit from day to day. By the calculation formula, a candidate of the bit rate BR in consideration of the maximum saving capacity MS, the frame rate selection value, and the like is calculated.

FIGS. 6A and 6B each illustrate an example of information that is set and input, six setting values of the frame rate selection value, and bit rates BR calculated by substituting the numerical values thereof into the bit rate calculation formula. For example, in FIG. 6A, six bit rates BR (0.8 Mbps to 8.6 Mbps) are calculated from the six setting values (30 FPS to 3 FPS) of the frame rate selection value.

FIG. 4D is an explanatory view illustrating an example of a saving period calculation formula. The saving period calculation formula is used to calculate the saving period T by using the maximum saving capacity MS and the number of cameras N which are stored in the storage unit 50, a predetermined frame rate, and a predetermined bit rate. The saving period calculation formula is a formula obtained by modifying the aforementioned bit rate calculation formula to calculate the saving period T.

The saving period calculation formula is used to obtain the saving period T, which is able to be set, by calculation when all the bit rates calculated by the aforementioned bit rate calculation formula do not meet the minimum bit rate BRmin (that is, when all the calculated bit rates are smaller than the minimum bit rate BRmin).

In the saving period calculation formula illustrated in FIG. 4D, the saving period T which is able to be set is calculated by using the minimum bit rate BRmin and the minimum frame rate FL among the frame rate selection values. For example, in a case where the numerical value of the saving period T input by the user is excessively large in the bit rate calculation formula, all the bit rates BR that are calculated may be smaller than the minimum bit rate BRmin. That is, this means that even in a case of data of a moving image captured with the minimum bit rate BRmin, moving image data for the saving period T that is input may not be able to be saved within the maximum storage capacity.

Thus, in order for the user to review the saving period T that is input, a proper saving period T in which at least data of a moving image captured with the minimum bit rate BRmin is able to be saved is calculated by the saving period calculation formula and presented to the user. Though the saving period T presented to the user is shorter than the saving period input by the user, when the user checks the presented saving period T and performs an input meaning that the presented saving period T is approvable, the presented saving period T is stored in the storage unit 50 as the saving period 52.

FIG. 4E is an explanatory view illustrating an example of mode setting selection criterion information. The mode setting selection criterion information indicates a selection criterion of the camera setting item in each of the setting modes M. The mode setting selection criterion information may be described as a condition of a step in a program.

In FIG. 4E, for example, in the motion priority mode M2, the minimum bit rate BRmin in the camera setting items is set as a selection item of a selection criterion and a content of the selection criterion indicates setting in which the bit rate BR that is able to be set is equal to or more than the minimum bit rate BRmin (=1.5 Mbps). That is, indicated here is a selection condition of the bit rate BR in the motion priority mode M2. For example, the selection condition means that, in the motion priority mode M2, four bit rates BR (1.7 Mbps to 6.6 Mbps) which are equal to or more than the minimum bit rate BRmin (=1.5 Mbps) among the six bit rates BR (0.8 Mbps to 8.6 Mbps) calculated in FIG. 6A may be selected as the bit rate BR of the camera.

In FIG. 4E, in the image quality priority mode M3, the maximum bit rate BRmax among the camera setting items is set as the selection item of the selection criterion and a content of the selection criterion indicates setting in which the bit rate BR that is able to be set is equal to or more than the maximum bit rate BRmax (=8 Mbps). That is, indicated here is also a selection condition of the bit rate BR in the image quality priority mode M3. For example, the selection condition means that, in the image quality priority mode M3, a bit rate BR (8.6 Mbps) which is equal to or more than the maximum bit rate BRmax (=8 Mbps) among the six bit rates BR (0.8 Mbps to 8.6 Mbps) calculated in FIG. 6A may be selected as the bit rate BR of the camera.

Further, in FIG. 4E, in the normal mode M1, an average value of frame rates among the camera setting items is set as the selection item of the selection criterion and a content of the selection criterion indicates setting in which the frame rate FL that is able to be set is an average value of a maximum frame rate and a minimum frame rate selected from the minimum bit rate BRmin and the maximum bit rate BRmax. That is, indicated here is a selection condition of the frame rate FL in the normal mode M1.

FIG. 4E illustrates an example of setting the frame rate and the bit rate as the mode setting selection criterion information, and the selection criterion for other setting items is set in advance similarly in each of the modes. A specific example of setting the frame rate and the bit rate in each of the setting modes will be described later.

FIG. 5D is an explanatory view illustrating an example of reduction setting criterion information. The reduction setting criterion information is information in which the setting criterion of each of the camera setting items in the high load time zone TZ (reduction setting necessity time zone) described above is set in advance. The reduction setting criterion information may be also described as a condition of a step in a program.

In a time zone other than the high load time zone TZ, it is assumed that image capturing of the camera is performed with the current camera setting content as illustrated in FIG. 5A, for example. In a case where a current time is in the high load time zone TZ, the setting content of each of the camera setting items is changed from the current camera setting content illustrated in FIG. 5A to the camera setting content after reduction illustrated in FIG. 5E on the basis of the reduction setting criterion information of FIG. 5D.

FIG. 5D illustrates an example of setting criteria of the frame rate FL and the resolution RE among the camera setting items in the high load time zone (reduction setting necessity time zone). In a case of being in the high load time zone TZ, the setting content of the frame rate FL is changed to be 80% of the current frame rate FL, and further, the frame rate is generally set as an integer value, so that an integer value obtained by rounding the numerical value, which is 80% of the current frame rate FL, down to the nearest decimal is set to the frame rate FL. In a case where the integer value after rounding up is 0, 1 FFS is set to the frame rate FL. Further, the case of being in the high load time zone TZ means that the setting content of the resolution RE is changed to a resolution smaller than the current resolution RE.

For example, in the current camera setting content illustrated in FIG. 5A, the setting of the frame rate FL (=3 FFS) of the camera with the camera number C001 is changed to 80% in the high load time zone TZ, the resultant is rounded down to the nearest decimal, and the frame rate FL (=2 FPS) of the camera with the camera number C001, which is indicated in the camera setting content after reduction of FIG. 5E, is obtained. Further, in the setting of the resolution RE, for example, the resolution RE of 1920×1080 is changed to 1280×720. The camera setting processing in the high load time zone will be illustrated in FIG. 9 described later.

<Setting Processing of Camera Setting Item>

Some embodiments of setting processing of a camera setting item performed by the image processing apparatus will be described below. The camera setting item will be described only for the bit rate BR and the frame rate FL as described above.

Embodiment 1

Here, by using the aforementioned camera setting information 56 stored in the storage unit 50 in advance, the camera setting items (frame rate FL, bit rate BR) corresponding to the number of cameras (N) 54, the current setting mode (M) 53, the saving period (T) 52, and the maximum saving capacity (MS) 55 are acquired, and the acquired camera setting items are transmitted to the camera.

Figure 7:
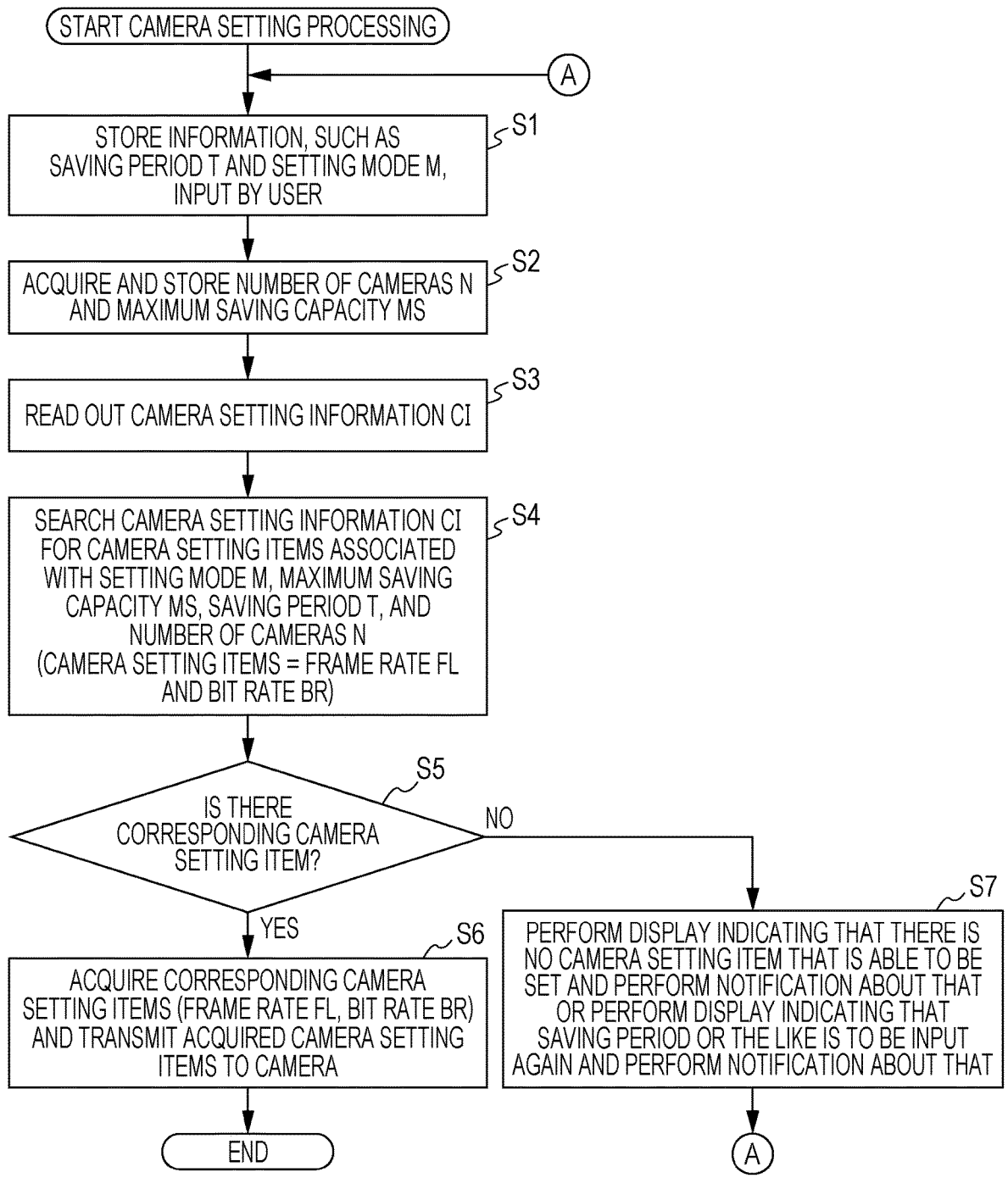
FIG. 7 is a flowchart of an example of setting processing of the camera setting item in the image processing apparatus of the disclosure.

FIG. 7 is a flowchart of an example of the setting processing of the camera setting item in the image processing apparatus of the disclosure.

At step S1 of FIG. 7, information input by the user is stored in the storage unit 50. For example, the user inputs the saving period (T) 52 and the setting mode (M) 53 by using the operation unit 12.

At step S2, the number of cameras (N) 54 and the maximum saving capacity (MS) 55 are acquired and stored in the storage unit 50. The user may input the number of cameras (N) 54 and the maximum saving capacity (MS) 55. In a case where the number of cameras (N) 54 and the maximum saving capacity (MS) 55 are stored in advance, the step may be omitted.

At step S3, the camera setting information CI 56 is read out from the storage unit 50. For example, the camera setting information CI 56 as illustrated in FIGS. 3A to 3C is read out.

At step S4, the camera setting items (frame rate FL, bit rate BR) associated with the current setting mode (M) 53, the maximum saving capacity (MS) 55, the saving period (T) 52, and the number of cameras (N) 54, which are input and acquired, are searched from the camera setting information CI 56.

At step S5, when there is a corresponding camera setting item in the camera setting information CI 56, the procedure proceeds to S6, and otherwise, the procedure proceeds to step S7.

At step S6, corresponding camera setting items (frame rate FL, bit rate BR) are acquired. For example, in a case where the setting mode M is the normal mode M1, the maximum saving capacity MS is 128 GB, the saving period T is 7 days, and the number of cameras N is 3, 3 FPS is acquired as the frame rate FL and 5 Mbps is acquired as the bit rate BR each from the camera setting information CI 56 of FIG. 3A.

Further, at step S6, the acquired camera setting items (frame rate FL, bit rate BR) are transmitted to the camera and the processing ends. In a case where a plurality of cameras are connected, the same camera setting items (frame rate FL, bit rate BR) may be transmitted to all the cameras. Alternatively, in a case where different camera setting items (frame rates FL, bit rates BR) are selected for each of the cameras, the processing from step S1 to step S7 may be performed for each of the cameras.

At step S7, display indicating that there is no camera setting item that is able to be set in the camera setting information CI 56 is performed on the display unit 13 to notify the user of that. Moreover, display indicating that the saving period or the like is to be input again may be performed on the display unit 13 to notify the user of that. Then, the procedure returns to step S1 and similar processing is repeated.

Accordingly, since the camera setting items corresponding to the current setting mode (M) 53, the maximum saving capacity (MS) 55, the saving period (T) 52, and the number of cameras (N) 54 are automatically selected by using the camera setting information CI 56, the user is able to promptly select the camera setting items and transmit the camera setting items to the camera only by performing a simple operation without individually setting and inputting the camera setting items, thus making it possible to reduce an operation burden on the user.

Note that, it may be configured so that, at step S6, after the acquired camera setting items (frame rate FL, bit rate BR) are acquired, the acquired camera setting items are displayed on the display unit 13 and the user is requested to check the acquired camera setting items, and when the user performs an input indicating approval, the acquired camera setting items are transmitted to the camera.

Moreover, in a case where the minimum bit rate BRmin is set as illustrated in FIG. 4B and a bit rate smaller than the minimum bit rate BRmin (=1.5 Mbps) is not to be adopted as a condition under which the bit rate BR is set, the bit rate BR selected when the saving period T is 30 days and the number of cameras is 3 or 4 in the normal mode M1 or the motion priority mode M2 in FIG. 3A or 3B, for example, is smaller than the minimum bit rate BRmin (=1.5 Mbps) and is thus not able to be set, and the processing of step S7 may be performed.

Embodiment 2

Here, by using not the camera setting information 56 as in Embodiment 1 but the number of cameras (N) 54, the current setting mode (M) 53, the saving period (T) 52, and the maximum saving capacity (MS) 55 that are obtained by input or the like, the camera setting items (frame rate FL, bit rate BR) are calculated by a predetermined calculation formula, and on the basis of the mode setting selection criterion information, the camera setting items are acquired and the acquired camera setting items are transmitted to the camera.

For example, as the formula to calculate the bit rate BR, the bit rate calculation formula illustrated in FIG. 4C is used. Further, it is assumed that the setting bit rate range information (minimum bit rate BRmin, maximum bit rate BRmax) illustrated in FIG. 4B is stored in advance and the mode setting selection criterion information illustrated in FIG. 4E is stored in advance.

Figure 8:
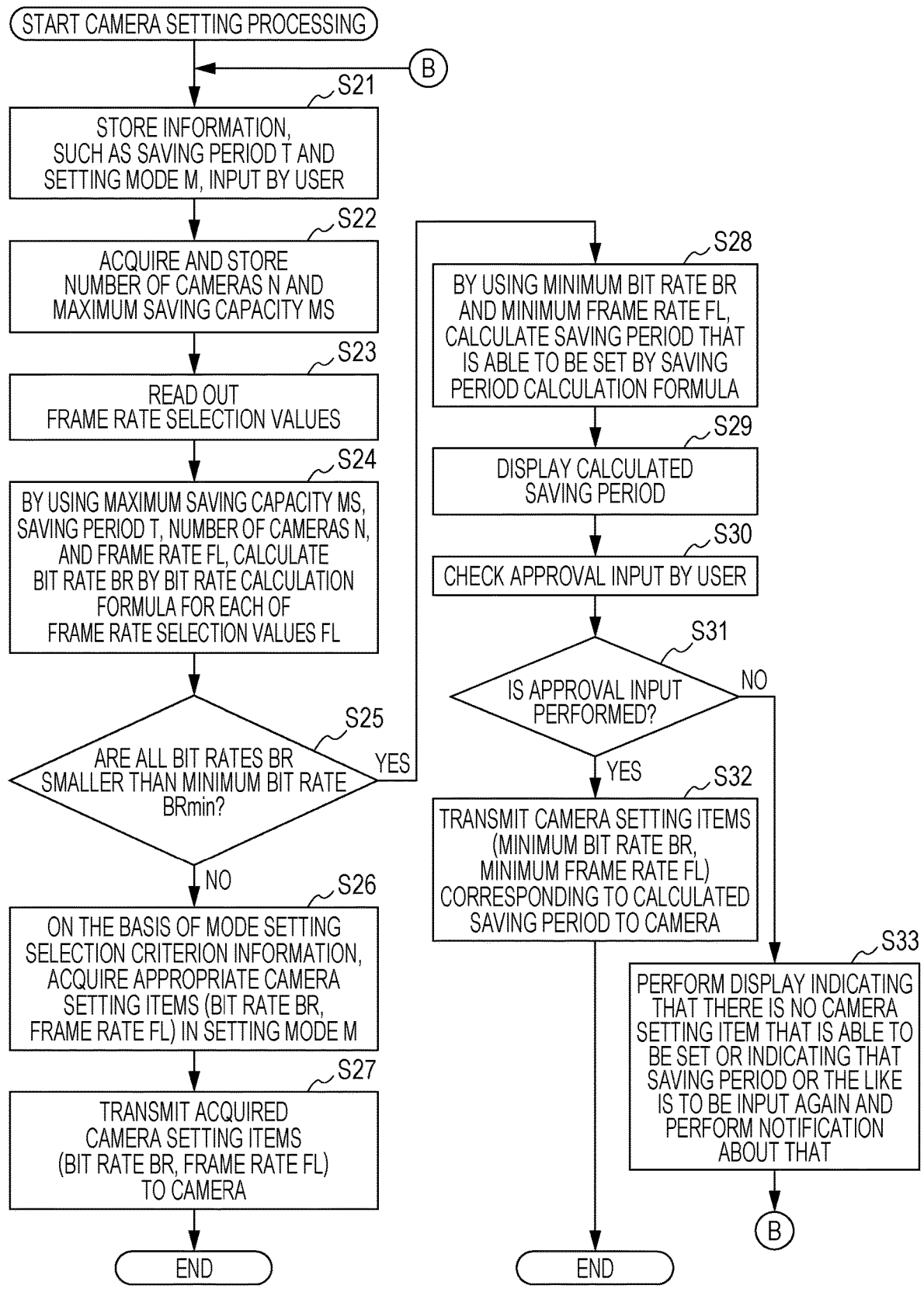
FIG. 8 is a flowchart of an example of setting processing of the camera setting item in the image processing apparatus of the disclosure.

FIG. 8 is a flowchart of an example of the setting processing of the camera setting item in the image processing apparatus of the disclosure.

At S21 of FIG. 8, information input by the user is stored in the storage unit 50. For example, the user inputs the saving period (T) 52 and the setting mode (M) 53 by using the operation unit 12.

At step S22, the number of cameras (N) 54 and the maximum saving capacity (MS) 55 are acquired and stored in the storage unit 50. The user may input the number of cameras (N) 54 and the maximum saving capacity (MS) 55. In a case where the number of cameras (N) 54 and the maximum saving capacity (MS) 55 are stored in advance, the step may be omitted.

At step S23, frame rate selection values are read out from the storage unit 50. For example, the frame rate selection values constituted by six frame rates FL as illustrated in FIG. 4A are read out.

At step S24, one frame rate FL among the frame rate selection values that are read out is selected, and by using the frame rate FL, the maximum saving capacity MS, the saving period T, and the number of cameras N, the bit rate BR is calculated by the bit rate calculation formula illustrated in FIG. 4C. Further, the bit rate BR is calculated by the bit rate calculation formula for each of the frame rates FL in the frame rate selection values.

Since there are six frame rates FL in the frame rate selection values illustrated in FIG. 4A, six bit rates BR are calculated. For example, in a case where the saving period T is 14 days, the number of cameras N is 4, the maximum saving capacity MS is 512 GB, and there are six patterns of frame rate selection values from 30 FPS to 3 FPS as illustrated in FIG. 6A, six bit rates BR from 0.8 Mbps to 8.6 Mbps are obtained as the bit rate BR by the bit rate calculation formula of FIG. 4C.

At step S25, whether or not all the calculated bit rates BR are smaller than the minimum bit rate BRmin is checked. In a case where all the bit rates BR are smaller than the minimum bit rate BRmin, the procedure proceeds to step S28, and otherwise, the procedure proceeds to step S26.

At step S26, on the basis of the mode setting selection criterion information, the camera setting items (frame rate FL, bit rate BR) appropriate in the current setting mode M are acquired.

At step S27, the acquired camera setting items (frame rate FL, bit rate BR) are transmitted to the camera and the processing ends. For example, in a case where the mode setting selection criterion information illustrated in FIG. 4E is stored and six bit rates BR as illustrated in FIG. 6A are calculated, the camera setting items (frame rate FL, bit rate BR) as follows are acquired in each of the setting modes.

First, in a case where the input setting mode M is the motion priority mode M2, the selection item of the motion priority mode M2 of the mode setting selection criterion information of FIG. 4E is the minimum bit rate BRmin and the selection criterion indicates that the bit rate BR is the minimum bit rate BRmin (=1.5 Mbps) or more. Thus, a combination of the bit rate BR equal to or more than 1.5 Mbps and the frame rate FL corresponding thereto is selected from six combinations of the bit rate BR and the frame rate FL of FIG. 6A.

In the motion priority mode M2, since it is desirable that the frame rate FL is large to obtain moving image data of a motion as smooth as possible, when there are a plurality of combinations of the bit rate BR and the frame rate FL satisfying the aforementioned selection criterion, a combination with the largest frame rate FL is to be adopted.

In a case of the six combinations of the bit rate BR and the frame rate FL of FIG. 6A, four combinations in which the bit rate BR is 1.7 Mbps to 8.6 Mbps satisfy the selection criterion that the bit rate BR is 1.5 Mbps or more In the four combination, the largest frame rate FL is 15 FPS so that a combination in which the bit rate BR is 1.7 Mbps and the frame rate FL is 15 FPS is acquired as the camera setting items.

In a case where the input setting mode M is the image quality priority mode M3, the selection item of the motion priority mode M3 of the mode setting selection criterion information of FIG. 4E is the maximum bit rate BRmax and the selection criterion indicates that the bit rate BR is the maximum bit rate BRmax (=8 Mbps) or more. Thus, a combination of the bit rate BR equal to or more than 8 Mbps and the frame rate FL corresponding thereto is selected from the six combinations of the bit rate BR and the frame rate FL of FIG. 6A.

In the image quality priority mode M3, since it is desirable that the bit rate BR is large even when the frame rate FL is small to obtain moving image data having image quality as good as possible, when there are a plurality of combinations of the bit rate BR and the frame rate FL satisfying the aforementioned selection criterion, a combination with the largest bit rate BR is to be adopted.

In a case of the six combinations of the bit rate BR and the frame rate FL of FIG. 6A, only one combination in which the bit rate BR is 8.6 Mbps satisfies the selection criterion that the bit rate BR is 8 Mbps or more. Thus, the combination in which the bit rate BR is 8.6 Mbps and the frame rate FL is 3 FPS is acquired as the camera setting items. However, in a case where an upper limit value of a range of the bit rate is set in advance as illustrated in FIG. 4B, when a value of the acquired bit rate BR exceeds the maximum bit rate BRmax, the maximum bit rate BRmax may be adopted as the bit rate BR. That is, even when the acquired bit rate BR is 8.6 Mbps, the value exceeds the maximum bit rate BRmax and the bit rate BR is thus set to 8 Mbps. In this case, a combination in which the bit rate BR is 8 Mbps and the frame rate FL is 3 FPS is acquired as the camera setting items.

In a case where the input setting mode M is the normal mode M1, the selection item of the normal mode M1 of the mode setting selection criterion information of FIG. 4E is an average value of the frame rates FL and the selection criterion indicates an average value of the maximum frame rate FL and the minimum frame rate FL obtained from the minimum bit rate BRmin and the maximum bit rate BRmax. Here, it is assumed that the maximum frame rate FL means the frame rate FL corresponding to the bit rate BR when the bit rate BR exceeds the minimum bit rate BRmin for the first time, and the minimum frame rate FL means the frame rate FL corresponding to the bit rate BR when the bit rate BR exceeds the maximum bit rate BRmax for the first time.

In a case where the minimum bit rate BRmin is 1.5 Mbps, in the six combinations of the bit rate BR and the frame rate FL of FIG. 6A, the bit rate BR when the bit rate BR exceeds the minimum bit rate BRmin (=1.5 Mbps) for the first time is 1.7 Mbps and the frame rate FL corresponding to this bit rate is 15 FPS. That is, the maximum frame rate FL is 15 FPS.

In a case where the maximum bit rate BRmax is 8 Mbps, in the six combinations of the bit rate BR and the frame rate FL of FIG. 6A, the bit rate BR when the bit rate BR exceeds the maximum bit rate BRmax for the first time is 8.6 Mbps and the frame rate corresponding to this bit rate is 3 FPS. That is, the minimum frame rate FL is 3 FPS.

In this case, the average value of the maximum frame rate FL and the minimum frame rate FL is (15+3)/2=9 FPS. In addition, when it is assumed that the bit rate BR is obtained by substituting the average value (9 FPS) into the aforementioned bit rate calculation formula, the bit rate BR is 2.8 Mbps. Thus, the camera setting items in which the bit rate BR is 2.8 Mbps and the frame rate FL is 9 FPS are acquired as the camera setting items of the normal mode M1.

Accordingly, since the camera setting items corresponding to the current setting mode (M) 53, the maximum saving capacity (MS) 55, the saving period (T) 52, and the number of cameras (N) 54 are automatically selected by using the mode setting selection criterion information stored in advance and the bit rate calculation formula, the user is able to promptly select the camera setting items and transmit the camera setting items to the camera by a simple operation without individually setting and inputting the camera setting items, thus making it possible to reduce an operation burden on the user.

On the other hand, in a case where all the calculated bit rates BR are smaller than the minimum bit rate BRmin at step S25, it is determined that there is no appropriate camera setting item to be set, and the saving period T that is able to be set is set again at step S28. The saving period T that is able to be set is shorter than the saving period input by the user. Here, the saving period T to be set again is calculated by the saving period calculation formula illustrated in FIG. 4D by using the minimum bit rate BRmin and the minimum frame rate FL which is the smallest in the frame rate selection values. It is assumed that the minimum bit rate BRmin is 1.5 Mbps and the minimum frame rate FL is 3 FPS.

For example, it is assumed that the input saving period T is 60 days, the acquired number of cameras N is 4, and the acquired maximum saving capacity MS is 256 GB as illustrated in FIG. 6B. In this case, when there are six patterns of frame rate selection values from 30 FPS to 3 FPS, six bit rates BR from 0.1 Mbps to 1.0 Mbps are obtained as the bit rate BR by the bit rate calculation formula of FIG. 4C. All the calculated six bit rates BR in FIG. 6B are smaller than the minimum bit rate BRmin (=1.5 Mbps).

Then, the saving period T is calculated by the saving period calculation formula of FIG. 4D at step S28. When 256 GB as the maximum saving capacity MS, 4 as the number of cameras N, 1.5 Mbps as the minimum bit rate BRmin, and 3 FPS as the minimum frame rate FL are substituted into the saving period calculation formula, the saving period T is about 40 days. The saving period T of 40 days is shorter than the saving period (60 days) originally requested by the user, but is a period in which moving image data having minimum image quality is able to be saved in the storage unit.

At step S29, the calculated saving period T is displayed on the display unit 13. The user checks the displayed saving period T and determines whether or not even the saving period T is approvable.

At step S30, whether or not the user performs an approval input is checked. In a case where the user performs the approval input at step S31, the procedure proceeds to step S32, and otherwise, the procedure proceeds to step S33.

At step S32, the camera setting items (minimum bit rate BRmin, minimum frame rate FL) corresponding to the calculated saving period T are transmitted to the camera and the processing ends.

At step S33, display indicating that there is no camera setting item that is able to be set or indicating that the saving period or the like is to be input again is performed on the display unit 13 to notify the user of that. Then, the procedure returns to step S21 and similar processing is repeated.

In this manner, in a case where moving image data having predetermined image quality is not able to be captured in the saving period T originally requested by the user, the saving period T is calculated and the saving period in which the moving image data having the predetermined image quality is able to be saved is presented to the user. When the user is able to approve the presented saving period, the user is able to promptly transmit the camera setting items to the camera without inputting the saving period T or the like again, thus making it possible to reduce an operation burden on the user.

In addition, though the minimum bit rate BRmin, and the minimum frame rate FL which is the smallest among the frame rate selection values are substituted into the saving period calculation formula to calculate the saving period T, there is not limitation thereto. For example, values of the bit rate and the frame rate to be substituted into the saving period calculation formula may be changed in accordance with the current setting mode M.

Embodiment 3-1

Here, a case where the setting content of the camera setting item is changed between the high load time zone and other time zone in the image processing apparatus will be described. For example, since the high load time zone is a time zone in which another function other than a function (such as the function of acquiring moving image data or the moving object detection function) using moving image data is frequently used, the setting content of the camera setting item is changed so that image processing performed for data of a moving image captured by the camera is reduced to prioritize processing of another function. In this case, for example, on the basis of the reduction setting criterion information stored in the storage unit 50 in advance, the setting content of the camera setting item is changed.

To the contrary, in a time zone other than the high load time zone, the setting content of the camera setting item is changed so that a reduction action applied to the image processing which is reduced in the high load time zone is cancelled. In this case, the setting content is returned to the setting content of the camera setting item which is set in a time zone not the high load time zone, for example.

Further, it is assumed that the image processing apparatus has a clock function of measuring a current time. It is assumed that the high load time zone TZ is stored in advance as illustrated in FIG. 5O.

Figure 9:
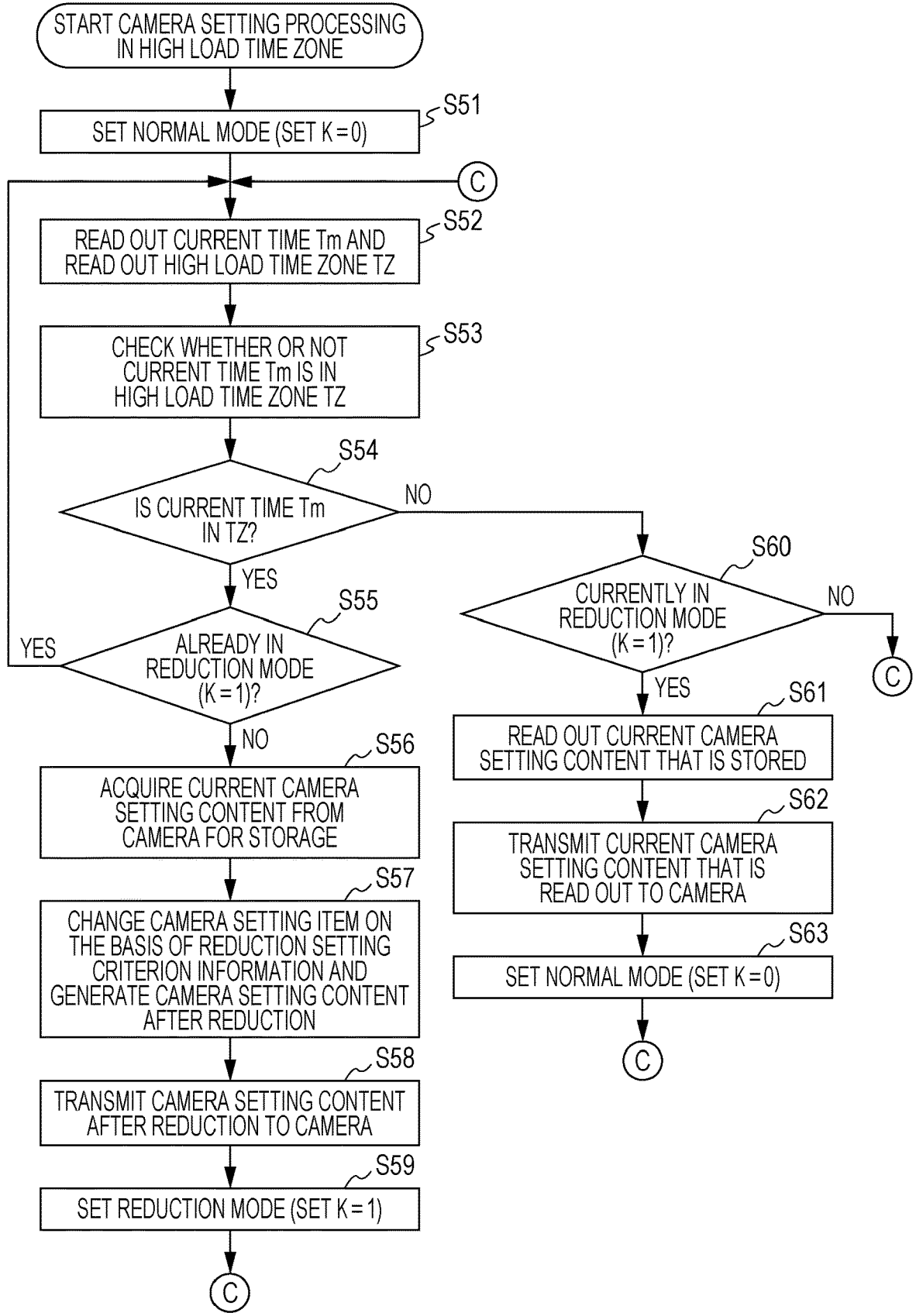
FIG. 9 is a flowchart of an example of setting processing of the camera setting item in a high load time zone in the image processing apparatus of the disclosure.

FIG. 9 is a flowchart of an example of setting processing of the camera setting item in the high load time zone in the image processing apparatus of the disclosure. Here, it is assumed that there are a camera setting processing mode (reduction mode) in which image processing of moving image data is reduced in the high load time zone and a camera setting processing mode (normal mode) in which image processing is not reduced, and the normal mode is provided when a variable K is 0 and the reduction mode is provided when the variable K is 1.

At step S51 of FIG. 9, the camera setting processing is set to the normal mode. That is, the variable K is initialized to 0. At step S52, a current time Tm is read out by the clock function. Further, the high load time zone (TZ) 59 stored in the storage unit 50 in advance is read out. At step S53, whether or not the current time Tm is in the high load time zone TZ is checked. At step S54, when the current time Tm is in the high load time zone TZ, the procedure proceeds to step S55, and otherwise, the procedure proceeds to step S60.

At step S55, whether or not the variable K is already 1 and the reduction mode is provided is checked. In a case where the variable K is not 1 (normal mode), the procedure proceeds to step S56, and in a case where the variable K is already 1 (reduction mode), the procedure returns to step S52. When the procedure proceeds to step 356, the current time Tm is in the high load time zone TZ, so that the setting content of the camera setting item is changed to the camera setting content after reduction.

At step S56, the current camera setting content is acquired from the camera. Here, the camera setting content acquisition unit 16 transmits, to the camera, information (setting request information) to request the camera setting content currently set to the camera. When the camera receives the setting request information, the camera setting content of the setting item currently set to the camera is read out from the image storage unit 82 and transmitted to the image processing apparatus. When acquiring the camera setting content transmitted from the camera, the image processing apparatus stores the camera setting content as the current camera setting content 57 in the storage unit 50.

At step S57, the setting content of the camera setting item is changed on the basis of the reduction setting criterion information and the camera setting content after reduction 58 is generated. Since information as illustrated in FIG. 5D described above is stored in advance, for example, as the reduction setting criterion information, the current camera setting content 57 of the camera setting item of the reduction setting criterion information is changed on the basis of the setting criterion thereof.

When the reduction setting criterion information of FIG. 5D is used, setting of the frame rate is changed to be 80% of the frame rate which is set to the current camera setting content 57. Further, setting of the resolution is changed to a resolution smaller than the resolution which is set to the current camera setting content 57. Accordingly, the current camera setting content 57 is changed and the camera setting content after reduction 58 as illustrated in FIG. 5E, for example, is generated.

At step S58, the camera setting content after reduction 58 which is generated is transmitted to the camera.

At step S59, the camera setting processing is set to the reduction mode and the procedure returns to step S52. That is, the variable K is set to 1.

At step S60, when the current time Tm is not in the high load time zone TZ, whether or not the reduction mode is currently set, that is, whether or not the variable K=1 is checked. When the variable K=1, the procedure proceeds to step 361, and otherwise (variable K=0), the procedure returns to step S52.

At step S61, the current camera setting content 57 stored in the storage unit 50 is read out.

At step S62, the current camera setting content 57 that is read out is transmitted to the camera.

At step S63, the camera setting processing is set to the normal mode and the procedure returns to step S52. That is, the variable K is set to 0.

As described above, in a case where the current time Tm is in the high load time zone TZ, by changing the camera setting content so that a load on the processing of moving image data is reduced, preferential processing of another function is allowed and it is possible to avoid a case where execution of the processing is affected, such as a case where processing of another function is delayed.

Embodiment 3-2

In addition, the high load time zone TZ may not be set fixedly, and the setting of the high load time zone TZ may be dynamically changed by measuring an average operation rate every past fixed time in the image processing apparatus and using the measured average operation rate. For example, a past fixed time period (time period such as 1 week, 10 days, or 1 month) is set, and an average operation rate (average value of the time in which a predetermined function is executed) every 1 hour in the time period is calculated. A threshold of the operation rate, which is a criterion to determine the high load time zone TZ, is set and stored in advance, the calculated average operation rate and the threshold of the operation rate are compared, and a time zone in which the calculated average operation rate is larger than the threshold of the operation rate is set as the high load time zone TZ.

Accordingly, the setting of the high load time zone TZ is changed in accordance with the average operation rate every past fixed time in the image processing apparatus, so that, in accordance with an actual use situation of the image processing apparatus, the camera setting content is able to be set appropriately on the basis of a relationship with a use frequency of a function other the function using moving image data.

Embodiment 3-3

In addition, in a case where the image processing apparatus is an image forming apparatus MFP, in a state where the image forming apparatus MFP is not used for a fixed time or more, the camera setting content may be changed at a timing when switched to a power saving state (sleep state) and a timing when the power saving state (sleep state) is switched to a state (standby state) in which a function is able to be executed. For example, when the image forming apparatus is in a normal operation state or the standby state, similarly to that case of the high load time zone TZ, the camera setting content is set to the camera setting content after reduction 58 described above.

The high load time zone TZ automatically ends in an interlocking manner when the image forming apparatus is switched to the sleep state, and the camera setting content is changed from the camera setting content after reduction 58 to the current camera setting content 57. After that, when being returned from the sleep state to the standby state, the current camera setting content 57 is returned to the camera setting content after reduction 58.

In this case as well, in accordance with an actual use situation of the image processing apparatus, the camera setting content is able to be set appropriately on the basis of a relationship with a use frequency of a function other the function using moving image data.

The present disclosure contains subject matter related to that disclosed in Japanese Priority Patent Application JP 2018-158483 filed in the Japan Patent Office on Aug. 27, 2018, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
    moving image data acquisition circuitry that acquire moving image data from one or more cameras connected via a network;
    a storage that stores the moving image data that is acquired and camera image related information used to generate a camera setting content of a setting item related to image capturing of a camera;
    camera setting change circuitry that generate or change the camera setting content associated with the camera image related information that is stored; and
    camera setting transmission circuitry that transmit, to the camera, the camera setting content that is generated,
    wherein
    the camera image related information includes at least a saving period in which the moving image data is saved in the storage, a number of cameras, a maximum saving capacity of a storage region in which the moving image data is stored, and a setting mode to distinguish an image-capturing situation of the camera.

2. The image processing apparatus according to claim 1, further comprising
    operation circuitry by which a user inputs information, wherein
    the saving period and the setting mode are information input by the user with use of the operation circuitry, and
    the number of cameras and the maximum saving capacity are information stored in the storage in advance.

3. The image processing apparatus according to claim 2, wherein
    camera setting information constituted by a camera setting content of each of setting items associated with the saving period of the moving image data, the number of cameras, the setting mode, and the maximum saving capacity in advance is stored in the storage in advance,
    the camera setting change circuitry search the camera setting information to select the camera setting content of the setting item corresponding to the saving period and the setting mode that are input and the number of cameras and the maximum saving capacity that are read out from the storage, and
    the camera setting transmission circuitry transmit, to the camera, the camera setting content that is selected.

4. The image processing apparatus according to claim 2, wherein
    the setting item related to image capturing of the camera includes a bit rate, a frame rate, and a resolution.

5. The image processing apparatus according to claim 4, wherein
    the bit rate is calculated by a bit rate calculation formula in which the saving period that is input, the number of cameras and the maximum saving capacity that are read out from the storage, and the frame rate are variables.

6. The image processing apparatus according to claim 5, wherein
    the setting mode includes a motion priority mode, an image quality priority mode, and a normal mode.

7. The image processing apparatus according to claim 6, wherein
    in a case where the setting mode that is input is the motion priority mode,
    among a plurality of bit rates obtained by substituting a plurality of frame rates into the bit rate calculation formula, a bit rate which is a predetermined minimum bit rate or more and has a smallest value and a frame rate used when the bit rate is calculated are included in the camera setting content to be transmitted to the camera.

8. The image processing apparatus according to claim 6, wherein
    in a case where the setting mode that is input is the image quality priority mode,
    among a plurality of bit rates obtained by substituting a plurality of frame rates into the bit rate calculation formula, a bit rate which is a predetermined maximum bit rate or more and has a smallest value and a frame rate used when the bit rate is calculated are included in the camera setting content to be transmitted to the camera.

9. The image processing apparatus according to claim 1, wherein a high load time zone is stored in the storage in advance as a time zone in which a function other than image processing using the moving image data acquired from the camera is frequently used, and in a case where a current time is in the high load time zone, the camera setting change circuitry change the camera setting content of the setting item related to image capturing of the camera so that a load applied to execute the image processing using the moving image data is reduced.

* * * * *